Oct. 7, 1969    J. MEDNEY    3,471,322
APPARATUS AND METHOD FOR FILAMENT WINDING
Filed April 18, 1967    2 Sheets-Sheet 1

INVENTOR.
JONAS MEDNEY
BY Sherman H. Barber
his Attorney

Oct. 7, 1969  J. MEDNEY  3,471,322
APPARATUS AND METHOD FOR FILAMENT WINDING
Filed April 18, 1967  2 Sheets-Sheet 2

INVENTOR.
JONAS MEDNEY
BY Sherman H. Barber
his Attorney

United States Patent Office 3,471,322
Patented Oct. 7, 1969

3,471,322
APPARATUS AND METHOD FOR FILAMENT WINDING
Jonas Medney, Oceanside, N.Y., assignor to Koppers Company, Inc., a corporation of Delaware
Continuation-in-part of application Ser. No. 493,199, Oct. 5, 1965. This application Apr. 18, 1967, Ser. No. 631,642
Int. Cl. B05c *3/02*; C23c *13/00*
U.S. Cl. 117—115                                     2 Claims

ABSTRACT OF THE DISCLOSURE

A method and apparatus is disclosed for resin impregnating continuous lengths of glass filament rovings. The apparatus comprises a resin holding receptacle, means for guiding at least two separate rovings along separate paths through the resin so that the separate rovings have principal traverse axes that are mutually perpendicular, and an orifice in one wall through which the resin-wet rovings pass. By coordinating the speed of the filament roving through a selected size of orifice with the viscosity of the resin, a desired glass-to-resin ratio is achieved. The glass filament rovings can be subjected to vacuum either before or after the impregnation steps.

CROSS REFERENCE TO RELATED APPLICATIONS

This is a continuation-in-part of copending application Ser. No. 493,199 filed Oct. 5, 1965, now abandoned.

BACKGROUND OF THE INVENTION

This invention relates to filament winding and, more particularly, to improved method and apparatus for resin wetting filaments used in filament winding.

One of the problems inherent in making filament reinforced plastic structures is the removal of surface moisture from the filaments and intersticial air from the rovings in order to obtain more thorough resin impregnations. A typical roving consists of a multiplicity of individual filaments which collectively have a great amount of surface to which moisture can cling. Likewise, there is considerable intersticial space between the filaments of the roving and considerable air generally is trapped in this intersticial space.

Usually, when rovings pass through a conventional resin bath, the resin does not impregnate all of the filaments simply because the entrapped air resists entrance of the resin and surface moisture tends to cling to and resist separating from the filament surface. However, apparatus of the present invention effects more thorough resin impregnation by displacing the intersticial air and surface moisture with resin.

SUMMARY OF THE INVENTION

Filament winding apparatus including a receptacle holding a quantity of thermosetting resin through which a plurality of reinforcing filaments in the form of a roving are guided so that the filaments become resin impregnated. The resin-wet roving is drawn through an orifice of preselected size at such a rate of speed that excess resin is removed and the ratio of filament-content to resin-content of the resin-wet roving emerging from the orifice is at least 75 to 25.

DETAILED DESCRIPTION

Figure 1:
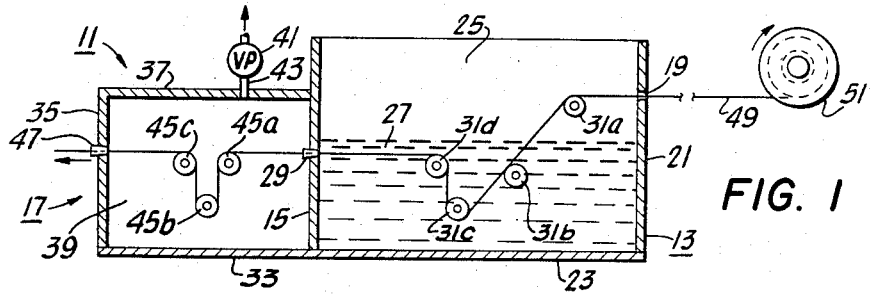
FIG. 1 is a schematic longitudinal sectional view of apparatus in accordance with one embodiment of the invention.

Referring to FIG. 1, first apparatus 11 in accordance with the invention includes a first receptacle 13 having one wall 15 in common with a second adjacent receptacle 17. The first receptacle 13 is not covered ordinarily, but the second receptacle 17 is totally enclosed. The first receptacle 13 has an orifice 19 in an end wall 21, situated opposite the common wall 15; a flat bottom 23; opposed sides 25 joining the bottom 23 and the end walls 15, 21; and a quantity of thermosetting resin 27 which may be replenished as required from a suitable source (not shown) to maintain the level of resin in the receptacle about where indicated in FIG. 1.

Figure 6:
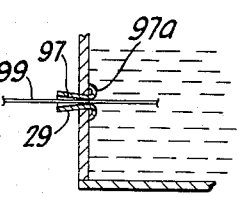
FIG. 6 is a schematic sectional view of an orifice in accordance with the invention.

The common wall 15 supports an orifice 29 which is shaped similar to the orifice shown in FIG. 6 and which is located above the bottom 23 at such a distance that the entrance of the orifice 29 is submerged in the resin 27.

Within the receptacle 13 are a plurality of horizontally disposed spaced apart breaker bars or rods 31a, 31b, 31c and 31d, each of which is secured in the opposing side walls 25. The breaker bar 31a is so situated above the bottom 23 that it is not submerged in the resin 27, whereas the other breaker rods 31b, 31c, and 31d are submerged within the resin bath 27.

The second receptacle 17 is a totally enclosed structure having the common wall 15 as one side and also bottom 33, end wall 35, top 37, and side walls 39. The interior of the second receptacle 17 is maintained under subatmospheric pressure during normal operation of the apparatus 11 by means of a vacuum pump 41 (VP) that communicates with the interior of the second receptacle by means of a conduit 43. Situated within the second receptacle 17 are a plurality of other horizontal spaced apart breaker bars or rods 45a, 45b, and 45c. These breaker rods are arranged, preferably, about as shown in FIG. 1 for a reason that will become apparent hereinafter.

The end wall 35 also supports an orifice 47 that is similar to the orifice 29 shown in FIG. 6. It is to be noted that the orifices 29 and 47 are coaxial and both are oriented in the same direction; that is to say, the entrance end of both orifices is at the right and the discharge end of both orifices is at the left, as viewed in FIG. 1.

Filament reinforcements 49, in the form of rovings, lead from a plurality of supply spools 51 (though only one is shown) through the orifice 19, over the first 31a and second 31b breaker bars, under the third breaker bar 31c, and over the fourth breaker bar 31d. It should be noted that the rovings 49, leading tangentially from the top of the breaker bar 31d, enter the orifice 29 axially. Within the second receptacle 17, the rovings 49 tangentially meet and pass over the breaker bar 45a, loop under the breaker bar 45b, and turn around the breaker bar 45c so as to tangentially leave therefrom and axially pass through the orifice 47.

Figure 2:
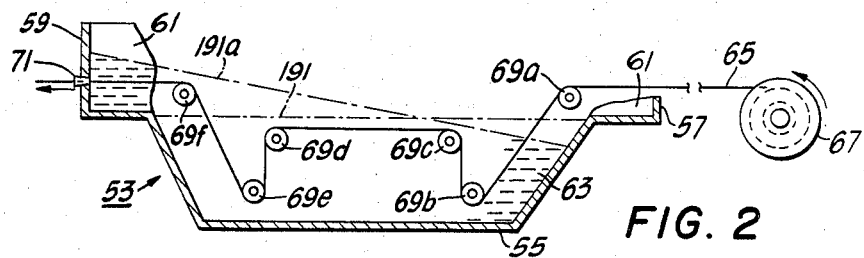
FIG. 2 is a schematic longitudinal sectional view of apparatus in accordance with another embodiment of the invention.

In the embodiment of the invention shown in FIG. 2, a single receptacle 53, has a dished bottom 55, opposed end walls 57, 59 and opposed side walls 61, and contains a quantity of resin 63. Filament rovings 65 leading from supply spools 67 pass over and under a plurality of breaker bars 69a–69f inclusive mounted horizontally between the side walls 61.

The breaker bar 69a, like the breaker bar 31a, serves to guide the rovings from the spools 67 and change the direction of lead of the rovings into the resin bath 63. Normally, the breaker bars 69b, 69c, 69d and 69e are so arranged and located that they, and the rovings in contact therewith, are continually submerged in the resin 63. The breaker bars 69f normally are located above the surface of the resin 63 when the rovings 65 are not passing through the apparatus 53, and the breaker bar 69f is also so located that the rovings 65 lead axially into an orifice 71 in the end wall 59 from the breaker bar 69f. The orifice 71 is similar to the orifice 29 shown in FIG. 6.

Figure 3:
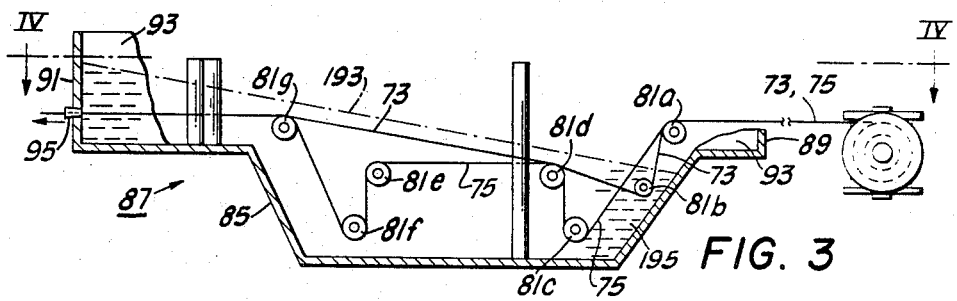
FIG. 3 is a schematic longitudinal sectional view of apparatus in accordance with a third embodiment of the invention.
Figure 4:
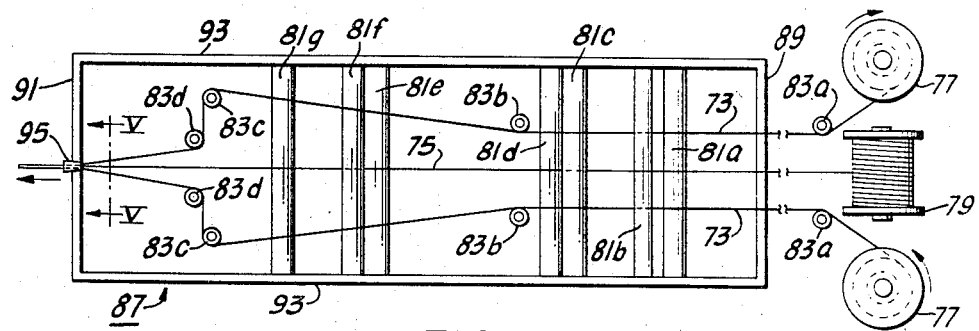
FIG. 4 is a plan view along line IV—IV of the apparatus of FIG. 3.

FIGS. 3 and 4 illustrate in sectional elevation and plan view respectively, another embodiment of the invention wherein a plurality of rovings 73, 75 leading from supply spools 77, 79 respectively, pass over and under horizontally arranged breaker bars 81a–81g inclusive, and around vertically arranged breaker bars 83a–83d inclusive. The spools 77 are mounted for rotation about vertical axes whereas the spool 79 is mounted for rotation about a horizontal axis. While only a single spool 79 is shown, it is to be understood that a plurality of such spools may be used if desired.

The vertical breaker bars 83b are secured in a suitable manner to a dished bottom 85 forming a part of another resin receptacle 87 also having end walls 89, 91, and side walls 93. The horizontal breaker bars 81a–81g are secured in a suitable manner to the side walls 93.

Figure 5:
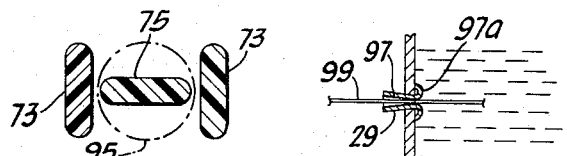
FIG. 5 is a sectional view along line V—V of FIG. 3.

The vertical breaker bars 83b–83d are so positioned within the resin receptacle 87 that the rovings 73 pass around the vertical breaker bar 83a, over the horizontal breaker bar 81a, under the horizontal breaker bar 81b, over the horizontal breaker bar 81d, around the vertical breaker bar 83b, over the breaker bar 81g, and then around the vertical breaker bars 83c and 83d. Thence, the rovings 73, having a somewhat flattened shape as suggested in FIG. 5, pass through an orifice 95, which is similar to the orifice 29, mounted in the end wall 91 in such a way that the axis of the orifice lies in the horizontal plane of the filament rovings 73 (FIG. 5).

The rovings 75 lead from the spool 79 and passes over the breaker bar 81a, under the breaker bar 81c, over bars 81d and 81e, under bar 81f, and over bar 81g. Thence, the rovings 75, also in a somewhat flattened form (FIG. 5), leads axially through the orifice 95.

The orifice 29, illustrated in FIG. 6, has side exit walls 97 that diverge from a throat at an included angle of about 12°, and the radius of the bend in the side entrance walls 97a at the throat is about ¼ inch. Preferably, the walls 97, 97a of the orifice 29 are made of hardened steel or ceramic, suitably treated to withstand abrasion from filaments 99, such as glass filaments, passing through the orifice 29.

Figure 7:
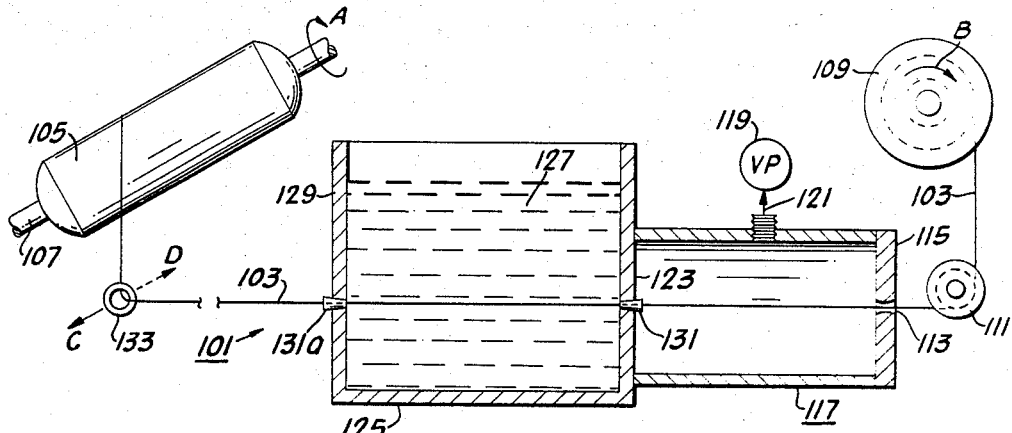
FIG. 7 is a schematic arrangement of a filament winding machine including a fourth embodiment of the invention.

FIG. 7 illustrates a filament winding machine 101 for winding resin-wet filaments in the form of roving 103 onto a shaped mandrel 105 that is rotatable in the direction of the arrow A, about the axis of a shaft 107. The roving 103 leads from a conventional supply spool 109, that is mounted for rotation in the direction of the arrow B, around a horizontally mounted roller 111 and through a confining orifice or opening 113 in an end wall 115 of vacuum chamber 117. The vacuum chamber 117 is connected to a vacuum pump 119 by means of a conduit 121 and is under subatmospheric pressure.

One end wall 123 of the vacuum chamber 117 is a common wall with a resin receptacle 125 containing a quantity of thermosetting resin 127. In the common wall 123, and in an opposite end wall 129, there are orifices 131, 131a, which are similar to the orifice 29 shown in FIG. 6. As may be seen from FIG. 7, the orifices 113, 131, 131a, are coaxial and roller 111 is so located that when the roving 103 leaves the roller 111, it travels along the axis of the orifices. When the roving 103 leaves the orifice 131a, it passes through a conventional traveling feeding eye 133 that reciprocates along the axis of the shaft 107 in the direction of the arrows C and D.

Figure 8:
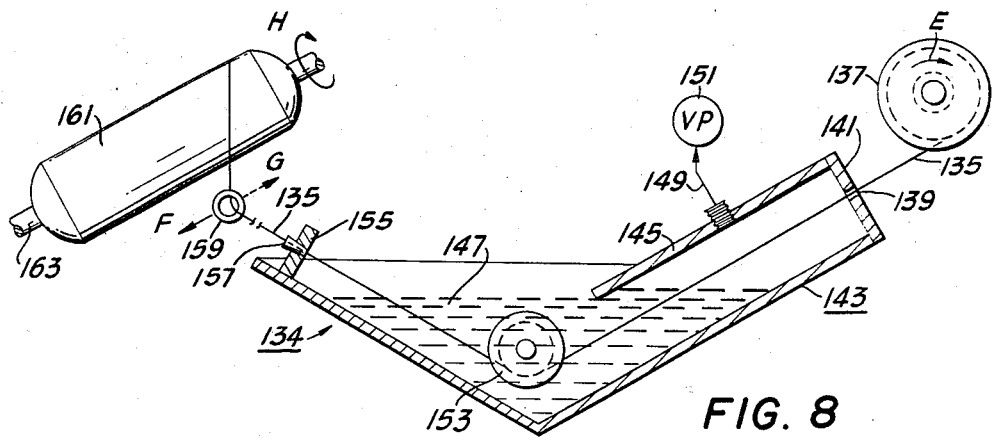
FIG. 8 is a schematic arrangement of a filament winding machine including a fifth embodiment of the invention.

FIG. 8 illustrates a filament winding machine 134 incorporating another embodiment of the invention wherein rovings 135, leading from a supply spool 137 rotating in the direction of arrow E, pass through a confining orifice 139 in an end wall 141 of a V-shaped resin receptacle 143. The right-hand portion of the V-shaped resin receptacle 143 is provided with a cover 145 having an edge which is immersed in resin 147 in the resin receptacle 143. A conduit 149 communicates with the interior of the right-hand portion of the receptacle 143 and with a vacuum pump 151 whereby the right-hand portion of the receptacle is maintained, during operation, under a slight vacuum.

A guide roller 153, or a breaker bar, is mounted in the lower portion of the resin receptacle 143; and an orifice support plate 155 is mounted near the upper left-hand edge of the V-shaped resin receptacle 143. An orifice 157, that is similar to the orifice 29 (FIG. 6), is mounted in the orifice plate 155 in such a manner that the rovings 135, passing around the guide roller 153, travel along the axis of the orifice 157. The rovings 135 then pass through a guiding eye 159 that reciprocates in the direction of the arrows F and G along the axis of a mandrel 161 rotating about shaft 163 in the direction of the arrow H.

Figure 9:
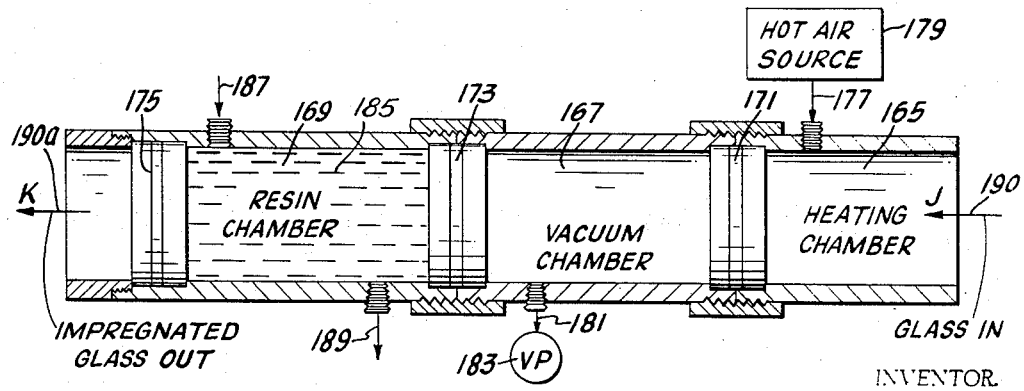
FIG. 9 is a schematic longitudinal sectional view of apparatus in accordance with a sixth embodiment of the invention.

FIG. 9 illustrates another embodiment of the invention wherein three interconnected chambers 165, 167, 169 are separated by common walls 171, 173; the chamber 169 also having an end wall 175. In each wall 171, 173, 175, there are orifices (not shown) that are similar to the orifice 29 (FIG. 6).

Chamber 165 is a heating chamber for drying surface moisture from the filaments of the rovings. Generally, it is open to atmosphere at the right-hand end (FIG. 9) and is provided with a conduit 177 that communicates with a source of heated air 179. Chamber 167, which abuts chamber 165 at the common wall 171, is a vacuum chamber for removing intersticial air from the roving. It is provided with a conduit 181 that communicates with a conventional vacuum pump 183. The other chamber 169 abuts the vacuum chamber 167 at the common wall 173 and is a resin receptacle wherein a quantity of resin 185 is maintained through an inlet conduit 187. A discharge conduit 189 is provided for use in removing used resin from the resin chamber when desired or when necessary.

As may be noted from FIG. 9, filament rovings 190 such as glass, entering the apparatus in the direction of the arrow J, pass through the several chambers 165, 167, 169 and emerge therefrom as resin-impregnated filaments 190a moving in the direction of the arrow K.

While FIGS. 7 and 8 illustrate winding machines 101 and 134 respectively, that incorporate respective embodiments of the invention, it is to be understood that any one of the several other embodiments of the invention illustrated in the drawings may be used in the winding machines 101, 134 instead of the particular embodiments of the invention shown in FIGS. 7 and 8.

In a filament winding machine, such as 101, using the apparatus shown in FIG. 1, the roving 49 passes through the resin 27 in chamber 13, and enters the orifice 29 which has a clear throat diameter of fifty-two thousandths (0.052) of an inch. The included angle of divergence of the side wall 97 of the orifice 29 is about 12° and the radius of wall 97a at the throat is about ¼ of an inch. The glass filament rovings comprise 60 ends of 204 filaments each; the speed of glass through the resin chamber and orifice is 200 feet per minute; and the viscosity of the resin is 2000 centipoises. Such a filament winding machine, incorporating the apparatus of FIG. 1, when operated under such circumstances and in the foregoing manner, produced a product that has a desirable glass-content to resin-content ratio of 75 to 25.

In the apparatus illustrated in FIG. 2, the roving 65 passes through the resin 63 and enters the orifice 71. When the rovings 65 are not moving through the resin, the level of the resin 63 is at 191, but, when the rovings 65 are moving through the apparatus from right to left, friction between the rovings and resin causes the resin level to shift in the direction of movement of the rovings. Thus, the level of the resin during operation of the apparatus assumes an inclined position 191a, and the entrance to the orifice, therefore, is submerged in the resin 63.

Likewise, when the apparatus of FIGS. 3 and 4 operates, the resin level shifts to an inclined position 193, and the entrance to the orifice 95 is also submerged in resin 195. Both the rovings 73 and 75 become resin impregnated during passage through the resin, and each roving assumes a somewhat flattened shape, as suggested in FIG. 5, before entering the orifice 95. When the rovings 73, 75, pass through the orifice 95, surplus resin is removed from the filaments by the restricting action of the radius walls 97a of the orifice and such restricting influence effectively removes surface moisture from the filaments and any interstitial air that may be entrapped within the rovings.

In the apparatus disclosed in FIGS. 7 and 8, the additional feature of a vacuum chamber enhances the resin impregnation by removing intersticial air as well as surface moisture from the rovings before the filaments are impregnated with resin.

The apparatus of FIG. 9 includes the heating chamber for the purpose of drying surface moisture that may be on the filaments of the rovings. Thereafter, the heated roving passes through the vacuum chamber and intersticial air is removed from the rovings as well as any surface moisture not heretofore evaporated when the roving passed through the heating chamber. After leaving the vacuum chamber, the roving passes through the resin chamber, becoming impregnated with resin, and thereafter the roving passes through an orifice like that of FIG. 6 in the wall 175.

A feature of the present invention is that when the size of the orifice, the viscosity of the resin, and speed of glass through the resin and orifice are coordinated, a high ratio of glass content to resin content is achieved in glass filament wound structures.

What is claimed is:
1. Filament winding apparatus wherein the improvement comprises:
   (a) a receptacle for holding a quantity of thermosetting resin having a preselected viscosity;
   (b) means to supply filament rovings to said receptacle;
   (c) guide means associated with said receptacle for directing said filament rovings from said supply means into said receptacle and into submergence in resin in said receptacle;
   (d) means that guide at least two separate rovings along separate paths through said resin, said separate rovings having principal transverse axes that are mutually perpendicular;
   (e) an orifice mounted in a wall of said receptacle and having a preselected size of throat entrance that is submerged in said resin;
   (f) means that merges said separate rovings as they pass simultaneously through said orifice and emerge therefrom as a single strand; and
   (g) means to move said rovings through said resin and through said orifice wherein excess resin is removed from said rovings, at such a speed that a preselected ratio of filament content to resin content of the rovings emerging from said orifice results.

2. The method for filament winding rovings wherein the improvement comprises:
   (a) maintaining a quantity of resin at a viscosity of about 2000 centipoises in a first receptacle;
   (b) passing said rovings through said resin and through an orifice having a throat diameter of about fifty-two thousandths of an inch submerged in said resin and located in a wall of said receptacle at a rate of speed of about 200 feet per minute, whereby the resin-wet rovings emerging from said orifice have a filament to resin ratio of 75 to 25;
   (c) passing two separate rovings through said resin in such a way that the principal transverse axes of said rovings are mutually perpendicular as they enter said orifice; and
   (d) merging said separate rovings into a single strand as they pass through said orifice.

References Cited
UNITED STATES PATENTS

| | | | |
|---|---|---|---|
| 3,146,962 | 9/1964 | Hardwick | 242—2 |
| 3,042,570 | 7/1962 | Bradt | 118—405 X |
| 2,848,354 | 8/1958 | Daley | 118—50 X |
| 2,410,127 | 10/1946 | Olson et al. | 118—405 X |

ALFRED L. LEAVITT, Primary Examiner

CHARLES R. WILSON, Assistant Examiner

U.S. Cl. X.R.

117—119; 118—405, 420